(12) United States Patent
Kley

(10) Patent No.: US 6,865,927 B1
(45) Date of Patent: Mar. 15, 2005

(54) SHARPNESS TESTING OF MICRO-OBJECTS SUCH AS MINIATURE DIAMOND TOOL TIPS

(75) Inventor: Victor B. Kley, Berkeley, CA (US)

(73) Assignee: General Nanotechnology LLC, Berkeley, CA (US)

( * ) Notice: Subject to any disclaimer, the term of this patent is extended or adjusted under 35 U.S.C. 154(b) by 169 days.

(21) Appl. No.: 10/370,088

(22) Filed: Feb. 18, 2003

Related U.S. Application Data

(63) Continuation-in-part of application No. 09/774,400, filed on Jan. 30, 2001, now abandoned.

(51) Int. Cl.[7] .................................................. G01J 1/24
(52) U.S. Cl. .......................... 73/105; 73/104; 250/307; 250/309; 250/310; 250/311; 356/239.2; 356/601

(56) References Cited

U.S. PATENT DOCUMENTS

| 3,586,865 A | 6/1971 | Baker et al. |
| 3,812,288 A | 5/1974 | Walsh et al. |
| 4,115,806 A | 9/1978 | Morton |

(List continued on next page.)

FOREIGN PATENT DOCUMENTS

| EP | 0325056 | 7/1989 |
| JP | 61-133065 | 6/1986 |
| JP | 1-262403 | 10/1989 |
| JP | 7-105580 | 4/1995 |
| WO | WO 96/03641 A1 | 2/1996 |
| WO | WO 97/04449 | 2/1997 |
| WO | WO 98/34092 A2 | 8/1998 |
| WO | WO 01/03157 | 1/2001 |

OTHER PUBLICATIONS

Ager et al., "Multilayer hard carbon films with low wear rates," *Surface and Coatings Technology*, 91:91–94 (1997).
Betzig et al "Near–Field Optics: Microscopy Spectroscopy and Surface Modification Beyond the Diffraction Limit" Science 257:(1992).
Dai et al. "Nanotubes as nanoprobes in scanning probe microscopy," Nature 384:147–150 (1996).

(List continued on next page.)

*Primary Examiner*—Hezron Williams
*Assistant Examiner*—David A. Rogers
(74) *Attorney, Agent, or Firm*—Townsend and Townsend and Crew LLP

(57) ABSTRACT

A micro-object having a desired sharp point or edge may be optically tested during fabrication. This is accomplished by applying a known force to the workpiece against an optically opaque layer disposed on a transparent substrate, passing light down the workpiece toward the opaque layer, and determining whether the shaped portion of the workpiece has sufficiently penetrated the opaque layer so that light passed through the workpiece can be detected on the remote side of the transparent substrate. If the light is not detected, the shaped portion of the workpiece is considered to be insufficiently sharp, and the workpiece can be subjected to further shaping operations. In another arrangement, after the force is applied to cause penetration of the opaque layer by the shaped portion of the workpiece, the substrate and the workpiece are moved laterally with respect to one another so as to form a scratch on the opaque layer. The workpiece can be removed from the vicinity of the opaque layer and the amount of light transmitted through the scratch can be measured. If the amount of light is sufficient, the shaped portion of the workpiece is considered to be sufficiently sharp.

17 Claims, 1 Drawing Sheet

U.S. PATENT DOCUMENTS

| | | |
|---|---|---|
| 4,604,520 A | 8/1986 | Pohl |
| 4,672,559 A | 6/1987 | Jansson et al. |
| 4,673,477 A | 6/1987 | Ramalingam et al. |
| RE32,457 E | 7/1987 | Matey |
| 4,681,451 A | 7/1987 | Guerra et al. |
| 4,697,594 A | 10/1987 | Mayo, Jr. |
| 4,831,614 A | 5/1989 | Duerig |
| 4,866,986 A | 9/1989 | Cichanski |
| 4,907,195 A | 3/1990 | Kazan et al. |
| 4,924,091 A | 5/1990 | Hansma et al. |
| 4,954,704 A | 9/1990 | Elings et al. |
| 4,999,495 A | 3/1991 | Miyata et al. |
| 5,001,344 A | 3/1991 | Kato et al. |
| 5,010,249 A | 4/1991 | Nishikawa |
| 5,015,850 A | 5/1991 | Zdeblick |
| 5,018,865 A | 5/1991 | Ferrell et al. |
| 5,025,346 A | 6/1991 | Tang |
| 5,038,322 A | 8/1991 | Van Loenen |
| 5,043,577 A | 8/1991 | Pohi |
| 5,047,633 A | 9/1991 | Finlan et al. |
| 5,047,649 A | 9/1991 | Hodgson et al. |
| 5,072,116 A | 12/1991 | Kawade et al. |
| 5,081,390 A | 1/1992 | Elings et al. |
| 5,105,305 A | 4/1992 | Betzig et al. |
| 5,107,112 A | 4/1992 | Yanagisawa et al. |
| 5,108,865 A | 4/1992 | Zwaldo et al. |
| 5,118,541 A | 6/1992 | Yamamoto et al. |
| 5,138,159 A | 8/1992 | Takase et al. |
| 5,142,145 A | 8/1992 | Yasutake |
| 5,148,307 A | 9/1992 | Kopelman et al. |
| 5,155,589 A | 10/1992 | Gere |
| 5,166,520 A | 11/1992 | Prater et al. |
| 5,187,367 A | 2/1993 | Miyazaki |
| RE34,214 E | 4/1993 | Carlsson et al. |
| 5,210,410 A | 5/1993 | Barret |
| 5,216,631 A | 6/1993 | Sliwa |
| 5,220,555 A | 6/1993 | Yanagisawa |
| 5,231,286 A | 7/1993 | Kajimura et al. |
| 5,241,527 A | 8/1993 | Eguchi |
| 5,249,077 A | 9/1993 | Laronga |
| 5,254,854 A | 10/1993 | Betzig |
| 5,260,824 A | 11/1993 | Okada et al. |
| 5,276,672 A | 1/1994 | Miyazaki |
| 5,278,704 A | 1/1994 | Matsuda |
| 5,283,437 A | 2/1994 | Greschner et al. |
| 5,289,408 A | 2/1994 | Mimura |
| 5,297,130 A | 3/1994 | Tagawa |
| 5,299,184 A | 3/1994 | Yamano |
| 5,302,239 A | 4/1994 | Roe et al. |
| 5,308,974 A | 5/1994 | Elings et al. |
| 5,317,152 A | 5/1994 | Takamatsu |
| 5,317,533 A | 5/1994 | Quate |
| 5,319,961 A | 6/1994 | Matsuyama et al. |
| 5,319,977 A | 6/1994 | Quate et al. |
| RE34,708 E | 8/1994 | Hansma et al. |
| 5,338,932 A | 8/1994 | Theodore et al. |
| 5,343,460 A | 8/1994 | Miyazaki |
| 5,349,735 A | 9/1994 | Kawase |
| 5,353,632 A | 10/1994 | Nakagawa |
| 5,354,985 A | 10/1994 | Quate |
| 5,357,109 A | 10/1994 | Kusumoto |
| 5,357,110 A | 10/1994 | Statham |
| 5,360,977 A | 11/1994 | Onuki et al. |
| 5,362,963 A | 11/1994 | Kopelman et al. |
| 5,373,494 A | 12/1994 | Kawagishi |
| 5,389,475 A | 2/1995 | Yanagisawa |
| 5,392,275 A | 2/1995 | Kawada et al. |
| 5,393,647 A | 2/1995 | Neukermans et al. |
| 5,396,483 A | 3/1995 | Matsida |
| 5,408,094 A | 4/1995 | Kajimura |
| 5,412,641 A | 5/1995 | Shinjo |
| 5,414,260 A | 5/1995 | Takimoto et al. |
| 5,414,690 A | 5/1995 | Shido et al. |
| 5,416,331 A | 5/1995 | Ichikawa et al. |
| 5,418,363 A | 5/1995 | Elings et al. |
| 5,426,631 A | 6/1995 | Miyazaki et al. |
| 5,453,970 A | 9/1995 | Rust et al. |
| 5,455,420 A | 10/1995 | Ho et al. |
| 5,461,605 A | 10/1995 | Takimoto |
| 5,463,897 A | 11/1995 | Prater et al. |
| 5,471,458 A | 11/1995 | Oguchi et al. |
| 5,472,881 A | 12/1995 | Beebe et al. |
| 5,490,132 A | 2/1996 | Yagi et al. |
| 5,495,109 A | 2/1996 | Lindsay et al. |
| 5,502,306 A | 3/1996 | Meisburger et al. |
| 5,506,829 A | 4/1996 | Yagi |
| 5,510,615 A | 4/1996 | Ho et al. |
| 5,519,686 A | 5/1996 | Yanagisawa et al. |
| 5,548,117 A | 8/1996 | Nakagawa |
| 5,559,328 A | 9/1996 | Weiss et al. |
| 5,560,244 A | 10/1996 | Prater et al. |
| 5,583,286 A | 12/1996 | Matsuyama |
| 5,602,820 A | 2/1997 | Wickramasinghe et al. |
| 5,610,898 A | 3/1997 | Takimoto |
| 5,623,476 A | 4/1997 | Eguchi |
| 5,634,230 A | 6/1997 | Maurer |
| 5,644,512 A | 7/1997 | Chernoff et al. |
| 5,679,952 A | 10/1997 | Lutwyche et al. |
| 5,717,680 A | 2/1998 | Yamano |
| 5,721,721 A | 2/1998 | Yanagisawa |
| 5,751,683 A | 5/1998 | Kley |
| 5,756,997 A | 5/1998 | Kley |
| 5,763,879 A | 6/1998 | Zimmer et al. |
| 5,804,709 A | 9/1998 | Bourgoin ..................... 73/105 |
| 5,821,410 A | 10/1998 | Xiang et al. |
| 5,825,670 A | 10/1998 | Chernoff et al. |
| 5,865,978 A | 2/1999 | Cohen |
| 5,874,726 A | 2/1999 | Haydon |
| 5,883,387 A | 3/1999 | Matsuyama et al. |
| 5,922,214 A | 7/1999 | Liu et al. |
| 6,031,756 A | 2/2000 | Gimzewski et al. |
| 6,066,265 A | 5/2000 | Galvin et al. |
| 6,101,164 A | 8/2000 | Kado et al. |
| 6,144,028 A | 11/2000 | Kley |
| 6,173,604 B1 | 1/2001 | Xiang ........................ 73/105 |
| 6,229,138 B1 | 5/2001 | Kley |
| 6,229,609 B1 | 5/2001 | Muramatsu et al. |
| 6,252,226 B1 | 6/2001 | Kley |
| 6,265,711 B1 | 7/2001 | Kley |
| 6,337,479 B1 | 1/2002 | Kley |
| 6,340,813 B1 | 1/2002 | Tominaga et al. |
| 6,353,219 B1 | 3/2002 | Kley |
| 2002/0007667 A1 | 1/2002 | Pohl et al. |

OTHER PUBLICATIONS

Davis "Deposition characterization and device development in diamond silicon carbide and gellium nitride thin films" J. Vac. Sci. Technol. A. 11(4), Jul./Aug. (1993).

Diaz, D.C., et al., An Improved Fabrication Technique for Porous Silicon, Rev. Sci. Instrum.64 (2), Feb. 1993, pp. 507–509.

Givargizov et al "Growth of diamond particles on sharpened silicon tips" Materials Letters 18:(1993).

Gomyou, H., et al. Effect of Electrohcemical Treatments on the Photoluminescence from Porous Silicon, J. Electrochem. Soc., vol. 139, No. 9, Sep. 1992, pp. L86–L88.

Nossarzewska–Orlowska, E., et al., Photoluminescence Properties of Porous Silicon Prepared by Electrochemical Etching of Si Epitaxial Layer, Acta Physica Polonica A, No. 4. vol. 84 (1993), pp. 713–716.

Rasmussen et al. "Fabrication of an All–metal Atomic Force Microscope Probe," IEEE (1997).

Rossow, U., et al., Influence of the Formation Conditions on the Microstructure of Porous Silicon Layers Studied by Spectroscopid Ellipsometry, Thin Solid Films, 255 (1995), pp. 5–8.

Smestad, G., et al., Photovoitaic Response in Electrchemically Prepared Photoluminescent Porous Silicon, Solar Energy Materials and Solar Cells, 26, pp. 277–283 (1992).

Tang, William Chi–Keung, "Electrostatic comb drive for resonant sensor and actuator applications," Abstract of dissertation at the University of California at Berkeley (1990).

Toledo–Crow et al "Near–field differential scanning optical microscope with atomic force regulation" Appl. Phys. Lett. 60: (1992).

Van Hulst et al "Near–field optical microscope using a silicon–nitride probe" Appl. Phys. Lett. 62: (1993).

Watson et al "The Radiation Patterns of Dielectric Rods–Experiment Theory" Journal of Applied Physics 19: (1948).

Jaschke et al. "Deposition of Organic Material by the Tip of a Scanning Force Microscope," Langmuir 11:1061–1064 (1995).

SHARPNESS TESTING OF MICRO-OBJECTS SUCH AS MINIATURE DIAMOND TOOL TIPS

CROSS-REFERENCES TO RELATED APPLICATION

This application is a continuation-in-part of U.S. patent application Ser. No. 09/774,400, filed Jan. 30, 2001 now abandoned, the entire disclosure of which is incorporated by reference for all purposes.

BACKGROUND OF THE INVENTION

The present invention relates generally to the manufacture and testing of micro-objects such as shaped tool heads or tips, and more particularly to the manufacture and testing of miniature tools incorporating or consisting of shaped structures.

Manufacturing and other processes pertaining to scanning probe microscopy, nanomachining, micromachining, machining, optics, biotechnology, and biomedicine often require highly specialized miniature tools. Such tools typically consist of a shaped tool head formed and parted from a diamond or other hard material workpiece and mounted on a body or handle. Present methods do not satisfactorily enable determining the sharpness or fineness of the tool head prior to its mounting to the tool body.

BRIEF SUMMARY OF THE INVENTION

According to an aspect of the invention, a micro-object having a desired sharp point or edge may be optically tested during fabrication. This is accomplished by applying a known force to the workpiece against an optically opaque layer disposed on a transparent substrate, passing light down the workpiece toward the opaque layer, and determining whether the shaped portion of the workpiece has sufficiently penetrated the opaque layer so that light passed through the workpiece can be detected on the remote side of the transparent substrate. If the light is not detected, the shaped portion of the workpiece is considered to be insufficiently sharp, and the workpiece can be subjected to further shaping operations. While it is possible to perform this testing during the process of aligning and embedding the micro-object in the reference structure, it is generally preferred to perform this testing when the workpiece is being shaped.

In an alternative arrangement, after the force is applied to cause penetration of the opaque layer by the shaped portion of the workpiece, the substrate and the workpiece are moved laterally with respect to one another so as to form a scratch on the opaque layer. The workpiece can be removed from the vicinity of the opaque layer and the amount of light transmitted through the scratch can be measured. If the amount of light is sufficient, the shaped portion of the workpiece is considered to be sufficiently sharp.

A further understanding of the nature and advantages of the present invention may be realized by reference to the remaining portions of the specification and the drawings.

DESCRIPTION OF SPECIFIC EMBODIMENTS

Figure 1A:
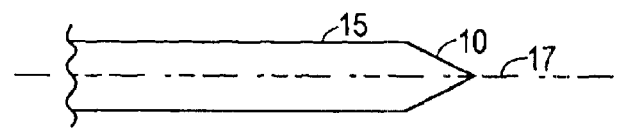
FIG. 1A is a partial side view of a workpiece that may be tested using embodiments of the present invention.

FIG. 1A is a schematic side plan view of a workpiece used in fabricating and testing micro-objects. The micro-objects may subsequently be mounted on supporting structures. In the illustrated embodiment, the ultimate micro-object is formed from a shaped portion 10 of a workpiece 15 having a central axis 17. The particular techniques for shaping the end of the workpiece 15, parting the shaped portion of the workpiece from the remainder of the workpiece, and mounting the resultant micro-object on a supporting structure are not a part of the invention, and will not be described in detail. Suffice it to say that the shaped portion may be formed by techniques such as chemically or abrasively lapping, etching, laser forming, ion milling or nanomachining.

Figure 1B:
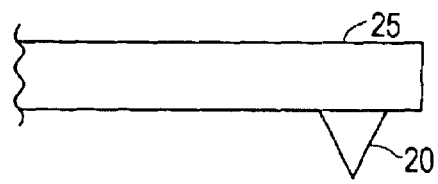
FIG. 1B is a partial side view of a tool tip bonded to a cantilever.

FIG. 1B shows the parted micro-object, designated 20, mounted to a supporting structure 25. In this particular application, the micro-object is a tool tip bonded to a cantilever.

It should be noted that the term micro-object refers to objects having dimensions in the tens of microns to hundreds of microns. However, the sharpness (measured in terms of a radius of curvature) of such micro-objects is in the nanometer range. Further, the workpiece from which micro-objects are made according to embodiments of the invention have dimensions in millimeters. For example a typical diamond workpiece might be 10–12 mm long and have a transverse rectangular or triangular cross sectional configurations with dimensions on the order of 4–5 mm.

The material of workpiece 10 depends on the application of the micro-object. If the micro object is to define a tool tip, the workpiece is typically composed of a hard material such as diamond, cubic boron nitride, carbon nitride, titanium nitride, tungsten carbide, titanium carbide, silicon nitride, or other materials. In some applications, such as microlenses, hardness of the workpiece is not the primary criterion, and the material can be chosen to satisfy other requirements such as providing desired optical properties. The shaped portion 10 is preferably of pyramidal, conical, blade or other sharp configuration known in the art. However, for some other applications, such as microlenses, the shaped portion may have a rounded shape (e.g., spherical, aspheric, cylindrical, etc.). However, the present invention is likely to find less usefulness when the shaped portion is rounded.

In a specific application, the micro-object is a diamond tool tip having a pyramidal shape (three sides and a triangular base or four sides and a quadrilateral base), and the supporting structure is a silicon cantilever structure. The axis 17 may be chosen to correspond to one of the diamond's hard axes (100 or 101).

Preferably, the sharpness of shaped portion 10 is tested prior to further steps in the fabrication of the composite tool. Such pre-testing typically involves a penetration or controlled scratch of a surface with a known force, analysis of the penetration or scratch providing a go/no go indication of a particular state of sharpness. Such pre-testing has the advantage of allowing determination of the suitability for intended purpose of shaped portion 10 before workpiece 15 is parted so as to permit rework as necessary.

Figure 2:
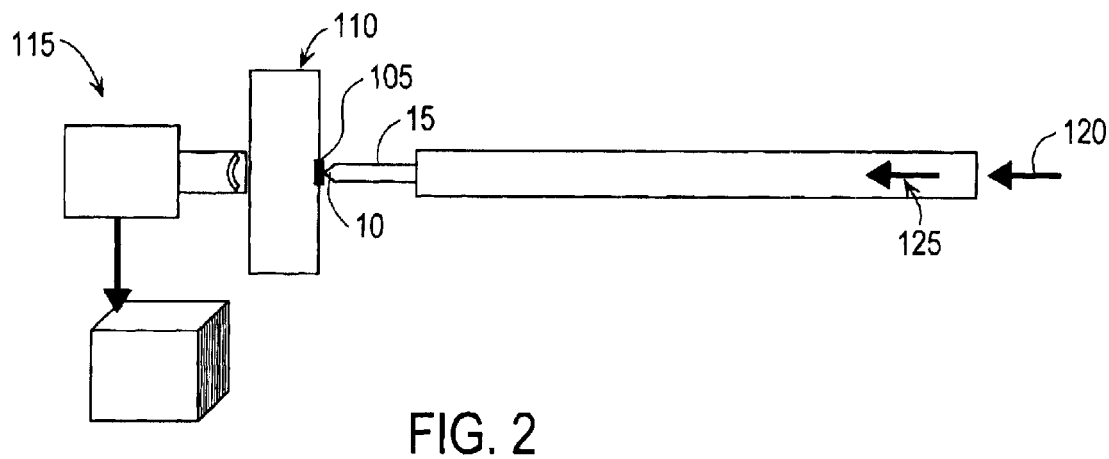
FIG. 2 is a side plan view of an arrangement for sharpness testing of a workpiece according to principles of the present invention.

FIG. 2 illustrates one approach for testing the sharpness of shaped portion 10 according to principles of the present invention. The technique includes forming an optically opaque layer of material 105 on one side of a substrate 110 and providing an optical detector 115 with suitable collection optics on the other side of substrate 110. Substrate 110 is preferably composed of a transparent or semi-transparent material having an index of refraction that matches or is greater than that of workpiece 15. The measurement is effected by exerting a known force 120 against workpiece 15, causing shaped portion 10 to penetrate opaque layer 105, and directing light 125 into workpiece 15 so as to propagate along workpiece 15 toward shaped portion 10. The penetration depth depends on the hardnesses of workpiece 15 and opaque layer 105, force 120, and the sharpness of shaped portion 10. The technique extracts information regarding the sharpness by determining information regarding the depth of penetration. Alternatively, workpiece 15 and/or substrate 110 may be composed of a non-transparent material. In such case, sharpness information may be similarly extracted through the use of electromagnetic radiation, other than light, such as infrared, medium infrared, ultraviolet and soft x-ray.

Initial design requires a determination of the thickness of opaque layer 105 and the force 120 to be applied. This is done by assuming that shaped portion 10 has a sharpness corresponding to the minimum sharpness that will be considered acceptable for incorporation into a composite structure. It is then straightforward to determine a thickness of the opaque material and a force such that force 120 causes shaped portion 10, having such an acceptable degree of sharpness, to penetrate opaque layer 105 to a depth that is within the tunneling distance of transparent substrate 110. The computation provides a series of possible thickness-force value pairs that can be used. The choice can be made by restricting the thickness and force to practical values. For example, force 120 should be small enough so as not to subject workpiece 15 to possible damage, while the thickness should be large enough to provide the needed opacity. In some instances, it may be desirable to have a composite layer structure on transparent substrate 110. This composite layer structure may include a thin layer of soft highly opaque material underlying a harder layer of material having less opacity. A possible configuration for such a layer structure includes a composite comprising a 2-micron aluminum layer, a 500-nm tungsten layer, a 100-nm titanium layer, and a quartz layer. Thus, if force 120 is sufficient to cause shaped portion 10 to penetrate the harder material, the softer opaque material will be penetrated easily.

There are a number of possible test protocols. For example, the test can be run so if an insufficiently sharp shaped portion 10 provides transmitted light 125 below a threshold, workpiece 15 is withdrawn from the vicinity of opaque layer 105 and the end of workpiece 15 subjected to further shaping operations. Alternatively, it is possible, in the event that the transmitted light 125 is below the threshold, to increase force 120 to an additional known value, and if the transmitted light 125 is now above the threshold, to flag shaped portion 10 as being suitable for parting and mounting for use in a less demanding application.

Figure 3:
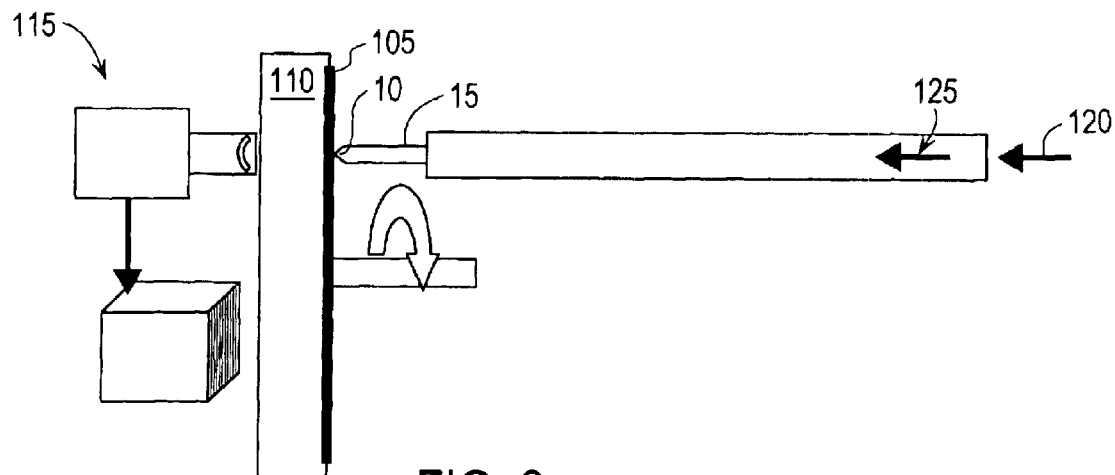
FIG. 3 is a side plan view of an alternative arrangement for sharpness testing of a workpiece according to principles of the present invention.

FIG. 3 shows an alternative configuration in which substrate 110 and workpiece 15 are moved laterally with respect to one another (by relative rotation or translation) after shaped portion 10 has penetrated opaque layer 105. This causes shaped portion 10 to scratch opaque layer 105. Workpiece 15 is then removed from the vicinity of opaque layer 105 and the amount of light 125 transmitted through the scratch is measured. If the amount of light 125 is sufficient, shaped portion 10 is considered to be sufficiently sharp. This technique has the additional advantage of testing for mechanical defects in shaped portion 10. If shaped portion 10 fractures when subjected to the transverse forces caused by the relative movement workpiece 15 can be reworked before shaped portion 10 is parted from the workpiece.

Although the invention has been described in terms of illustrative embodiments, the above description should not be taken as limiting the scope of the invention as defined by the claims.

What is claimed is:

1. A method of testing a workpiece of known hardness to determine the sharpness of an end of the workpiece, the method comprising:

providing a layer structure of known hardness characteristics and known thickness on a substrate;

applying the end of the workpiece against the layer structure with a known force;

directing electromagnetic radiation along the workpiece toward the end of the workpiece;

measuring an amount of electromagnetic radiation passing through the substrate as a result of the end of the workpiece penetrating the layer structure;

determining information about the sharpness of the end of the workpiece based on the amount of electromagnetic radiation so measured.

2. The method of claim 1, wherein the known force and known thickness are determined by:

using (a) a hypothetical workpiece having the hardness of the actual workpiece and having an end with a particular desired sharpness, and (b) a hypothetical material having the known hardness characteristics of the layer structure, to determine analytically a penetration depth of the hypothetical workpiece into the hypothetical material, the penetration depth being determined for a number of applied forces;

selecting a suitable force value and penetration depth value;

determining a thickness of the layer structure that is given by the suitable penetration depth plus the tunneling distance of the layer structure.

3. The method of claim 1, wherein the index of refraction of the substrate is at least as great as the index of refraction of the workpiece.

4. The method of claim 1, wherein the layer structure consists of a single layer of material.

5. The method of claim 1, wherein the layer structure is a composite layer structure comprising first and second materials, the first material being softer and more opaque than the second material.

6. A method of testing a workpiece of known hardness to determine the sharpness of an end of the workpiece, the method comprising:

providing an opaque layer structure of known hardness characteristics and known thickness on a transparent substrate;

applying the end of the workpiece against the opaque layer structure with a known force;

directing light along the workpiece toward the end of the workpiece;

measuring an amount of light passing through the transparent substrate as a result of the end of the workpiece penetrating the opaque layer structure;

determining information about the sharpness of the end of the workpiece based on the amount of light so measured.

7. The method of claim 6, wherein the known force and known thickness are determined by:
- using (a) a hypothetical workpiece having the hardness of the actual workpiece and having an end with a particular desired sharpness, and (b) a hypothetical material having the known hardness characteristics of the layer structure, to determine analytically a penetration depth of the hypothetical workpiece into the hypothetical material, the penetration depth being determined for a number of applied forces;
- selecting a suitable force value and penetration depth value;
- determining a thickness that is given by the suitable penetration depth plus the tunneling distance of the opaque layer structure.

8. The method of claim 6, wherein the index of refraction of the substrate is at least as great as the index of refraction of the workpiece.

9. The method of claim 6, wherein the opaque layer structure consists of a single layer of material.

10. The method of claim 6, wherein the opaque layer structure is a composite layer structure comprising first and second materials, the first material being softer and more opaque than the second material.

11. A method of testing a workpiece of known hardness to determine the sharpness of an end of the workpiece, the method comprising:
- providing a layer structure of known hardness characteristics and known thickness on a substrate;
- applying the end of the workpiece against the layer structure with a known force;
- effecting relative lateral movement between the workpiece and the substrate in order to form a scratch in the layer structure;
- directing electromagnetic radiation toward the scratch on the layer structure;
- measuring an amount of electromagnetic radiation passing through the substrate as a result of the end of the workpiece having scratched the layer structure;
- determining information about the sharpness of the end of the workpiece based on the amount of electromagnetic radiation so measured.

12. The method of claim 11, wherein the layer structure consists of a single layer of material.

13. The method of claim 11, wherein the layer structure is a composite layer structure comprising first and second materials, the first material being softer and more opaque than the second material.

14. The method of claim 11, wherein directing electromagnetic radiation toward the scratch is performed after removing the end of the workpiece from the layer structure.

15. The method of claim 11, and further comprising:
- prior to effecting relative lateral movement, directing electromagnetic radiation along the workpiece toward the end of the workpiece;
- measuring an amount of electromagnetic radiation passing through the substrate as a result of the end of the workpiece penetrating the layer structure; and
- only effecting the relative lateral movement after it has been determined that a sufficient amount of electromagnetic radiation passed through the substrate to signify penetration of the opaque layer structure.

16. The method of claim 11, wherein the known force and known thickness are determined by:
- using (a) a hypothetical workpiece having the hardness of the actual workpiece and having an end with a particular desired sharpness, and (b) a hypothetical material having the known hardness characteristics of the layer structure, to determine analytically a penetration depth of the hypothetical workpiece into the hypothetical material, the penetration depth being determined for a number of applied forces;
- selecting a suitable force value and penetration depth value;
- determining a thickness that is given by the suitable penetration depth plus the tunneling distance of the layer structure.

17. The method of claim 11, wherein the index of refraction of the substrate is at least as great as the index of refraction of the workpiece.

* * * * *